_United States Patent Office_

2,793,933
Patented May 28, 1957

2,793,933

METHOD OF PRODUCING LITHIUM SALTS FROM LITHIUM MINERALS

Adolphe Victor Kroll, Grevenmacher-Pietert, Luxembourg, assignor to Compagnie Geologique et Miniere des Ingenieurs et Industriels Belges "Geomines" Societe Par Actions a Responsabilite Limitee, Manono, Belgian Congo, a company of Belgian Congo No Drawing. Application October 6, 1953,
Serial No. 384,510

Claims priority, application Belgium May 7, 1949

5 Claims. (Cl. 23—27)

The present application is a continuation-in-part of applicant's co-pending application Serial No. 159,390, filed May 1, 1950 (now U. S. Patent No. 2,662,809).

It is known that among the lithium ores, those containing the mineral spodumene, i. e. metasilicate of aluminum and lithium, have the lowest solubility in their natural state, especially when the spodumene is of great purity.

In the co-pending application there is described and claimed a method of recovering lithium from its aluminum and silicate containing ores comprising mixing the ore with at least 2.5% but less than 100% of an alkaline compound selected from the group consisting of the oxides, carbonates and hydroxides of alkali metals other than lithium and the oxides, carbonates and hydroxides of the alkaline earth metals based upon the lithium mineral content of the ore, calcining said mixture at a temperature from about 700° C. upwards to at least partially fuse the mixture to obtain thereby a calcined product non-leachable with water, and thereafter leaching the calcined product with an aqueous leaching electrolyte other than lithium, said electrolyte being selected from the group consisting of hydrochloric acid, alkali metal chlorides, alkali metal sulphates, alkali metal nitrates, alkaline earth chlorides and alkaline earth nitrates to obtain the lithium salt formed in the aqueous leaching solution.

The nitrates, nitrites and sulfates of the alkaline metals other than lithium and of the alkaline earth metals may be calcined in admixture with the lithium ore in an amount of from about 0.5% up to about 100%, based upon the weight of the ore. The molar reacting quantity of the sulfate or nitrate is less than that to fully saturate the silicic acid in the ore and the mixture is calcined at a temperature of about 1000° C. to about 1350° C. whereby a chemical reaction occurs which converts the lithium in the ore into a state of sufficient solubility with a leaching electrolyte such as a solution of an alkali metal (other than lithium) or an alkaline earth, chloride, sulfate, or nitrate. The state of saturation by calcination within the critical temperature range and with the addition of the limited amount of the sulfate or nitrate reagent as indicated above provides a calcined product which is per se non-leachable with water, in the practical commercial sense of this term.

It is well known that, by heating a lithium ore such as spodumene, which is the relatively pure ore, beta spodumene is formed at temperatures of about 1100° C. and that by raising and holding the temperature at 1300° C., the spodumene is converted into a vitreous state in which the characteristic crystallinity of the beta spodumene is lost and the gamma variety of spodumene is thereby attained. The fundamental discovery has been made by the applicant that gamma spodumene has characteristically different properties to differentiate it not only physically but also chemically from the beta variety and it has been surprisingly found that the gamma variety obtained by calcining the ore at this temperature may readily be ground to a fine powder and thereafter leached with the electrolyte to produce surprising yields of recovered lithium in the amount of about 72%. Contrasted with the prior art processes (U. S. Patent No. 2,020,854), the calcining at 1300° C., grinding and leaching, is surprisingly efficient as compared with, for example, the process utilizing lime stone or chalk additions in an excess amount of 100% or more, based upon the CaO content of the lime stone relative to the weight of the lithium mineral in the ore, subsequent extraction with water and yields which are essentially no better than those found herein without the use of the lime addition.

The formation of the gamma vitreous variety of spodumene by means of a very strong calcination of the pure ore is probably the reason for the favorable action obtained with small quantities of lime added to the ore before the calcination, since said addition substantially lowers the fusion point and the vitrification point of the mixture. The new and surprising results have been obtained with extremely low quantities of quick lime added before calcination at high temperature of the mixture of said additional quick lime with pure spodumene.

Whereas pure beta spodumene calcined at 1100° C. up to the complete decrepitation of the alpha spodumene, gives but a yield of extracted lithium of 58%, the yield with pure gamma spodumene obtained by calcination at about 1300° C. was 72%, that of the same spodumene mixed with 0.5% of quick lime and subsequently calcined at the same vitrification temperature (1300° C). was of 77%. When calcined with an addition 2% of quick lime this yield is improved up to 82% of extracted lithium.

The extraction runs are performed in all cases under exactly the same conditions of temperature and of pressure as well as of time of treatment.

These results are sufficiently practical for technical application if one takes into account the facility and the economy of the treatment of the ores with as small quantities of added flux as stated above.

The effectiveness of such small quantities of additions permits the use of special lime compounds to be mixed with the ore, and those which yield free lime under the action of heat during calcination, which free lime readily combines with the ore. Such compounds are not only carbonates as well as sulfates and nitrates of alkaline earth metals, but also organic salts which easily decompose under the action of heat such as the acetates, oxalates, saccharates, etc. of lime, the admixture of such salts to the ore being facilitated (for some of them) by their solubility in water and by the consequent possibility of preparing therefrom very intimate liquid mixtures with the ore if the latter is at a powdery state.

The use of said salts heretofore was prohibitive by reason of the large amount required and their high price. Up to the present, it was unknown that such salts can be used in such small quantities as found according to the present invention. The said organic salts have the added advantage of acting at the same time as agglutinating or binding agents for the mass during calcination, and better physical conditions are provided for uniformity of heating during calcination.

Thus, the obtained results prove that quantities of quick lime added to the ore before calcination, which are below 2.5% and about 0.5%, still yield results which are of practical importance, if there is taken into account that the yields of extracted lithium of about 75%–88% based on the lithium content of the ore are still higher than the yields obtainable by the prior art extraction processes.

As indicated above, the spodumene ore is firstly calcined in admixture with a small amount of alkali-metal or alkaline earth metal oxides, hydroxides or salts forming these oxides during calcination. The calcination brings about a chemical reaction of the mixture, and it is a feature of the invention, that the addition of the oxide material is too small to bring about a sufficient solubility of the calcined product in pure water to readily reach lithium salts thereby as is necessary in industrial application. It is necessary to use an aqueous solvent to leach the calcined product which has not been chemically saturated with the oxide material. The leaching solvent may be a mineral acid such as an aqueous hydrochloric acid but preferably an electrolyte is used, such as an aqueous solution of salts ionized by electrolytical dissociation producing anions of acid radical, such as the salts of alkali- or alkaline earth metals which may be of acid, neutral or alkaline character and the operation is preferably performed at a temperature over 100° C. under super-atmospheric pressure.

By the calcination of the oxide mixture the natural molecular constitution of the spodumene is altered by chemical reaction to enable the acidic anions of the aqueous electrolyte solution to react promptly and completely upon the calcined product to produce soluble lithium salts by a new chemical equilibrium.

The lixiviation of calcined lithium ore, especially spodumene, with aqueous solutions of salts is a well known method, being based upon the behavior of cationic metal base exchangers of a zeolitic nature. The calcination treatment of the invention permits a great increase in the cationic exchange reaction obtained by using a lithium ore whose aluminum silicate constitution approaches that of the zeolites, by mixing it with a moderate amount of alkaline metal oxides or substances yielding alkaline metal oxides, and thereafter calcining the mixture. The added oxides are adjusted within the limits corresponding to the "permutites" or artificial zeolites. These limits are exceeded when the amount of added metal oxide is increased up to the saturation of the silicic acid in the mineral as determined by the formation of an orthosilicate of this oxide. Such saturation is reached when the proportion of component in the mixture to be calcined is 1.1 parts oxide to 1 part mineral.

The addition of oxides beyond the permutite limit causes a destruction of the zeolitic nature of the mineral because of cationic base exchange reaction carried out in the heat, which liberates lithium oxide during the calcination period, and results in the solubility for a solution of lithium in pure water as the hydroxide. Such complete saturation is at the present time the basis of all known processes of lixiviation of lithium minerals which are calcined with an excess of oxide and extracted with water to dissolve the lithium oxide and other alkaline values as hydroxides, and without a wet base exchange reaction, leading directly to salts of lithium.

The lixiviation with water of such silicates saturated with oxide of calcium is characterised in that the calcined residues are free from chemically retained alkali metal. It is claimed in these processes that all kinds of alkali compounds of the ore may be recovered as hydroxides. The alkali compounds are recovered as salts only if the latter are formed as such during calcination of a mixture specially compounded with acidic salts. There is no consumption of salt in the lixiviating liquor but an extraction and recovery of all alkali compounds present in the ore and in the calcined product (see Colton 2,021,987).

The consumption of a part of the lixiviating solution together with the extraction of the lithium as a salt, is a typical zeolite reaction with a mineral of increased reactivity according to the inventive method herein.

The alkali consumed during the wet extraction process enters into the mineral molecule to replace lithium, only as a result of a cation base exchange process. New alkali salt is added when the mother liquor is recycled, whereas in the old and known processes alkali is recovered out of a saturated solution by cooling the lixiviating liquor, to crystallize out their salts of alkali metals extracted together with the lithium from the ore or calcined mass.

In the known processes of lixiviation, lithium is already present as a water soluble salt in the calcined mass, and where lithium is extracted as a hydroxide it is present in the calcined mass as the free oxide of lithium, which reacting with water, gives a soluble hydroxide.

The aqueous electrolyte solution may contain hydrochloric acid or such salts as sodium chloride, sodium sulphate, sodium or calcium nitrate or nitrite. The anions are respectively $Cl^-$, $SO_4^{--}$, $NO_3^-$, $NO_2^-$. They are of two kinds: The halogen anions and the anions yielding oxy salts.

Thus, the new process consists of mixing the lithium ore in a pulverized state with an oxide or an oxidic salt yielding oxide with heating such as may be chosen from the group of alkali metal oxides or hydroxides and sulphates, alkaline earth metal oxides, or hydroxides, carbonates, nitrates, nitrites or sulphates of these which are present in the mixture in an amount insufficient to completely react with all of the silicate present in the ore and insufficient to make the calcined lithium-containing product industrially soluble in water (which is equivalent to the formation of an orthosilicate of chalk by saturation). The chemical reaction of the constituents of the mixture being carried out by calcination at a temperature which is sufficiently high to at least partially fuse (sinter) the mixture, the calcined product is brought preferably in form of a pulp in contact with an aqueous ionized solution containing anions of an acid radical in a quantity sufficient to bring about an extraction of lithium compounds from the mineral, with surprisingly high yields.

The dimensions of the calcination and extraction apparatus must be increased in nearly the same proportions as an addition to the spodumene of quantities of lime over 25% or even over 50% is used, on account of the increased masses to be treated. The limit of addition of lime in the new process is overstepped with a 100% addition to the pure spodumene, the calcined product being then sufficiently soluble in pure water, to allow the extraction by pure water of its lithium content.

As compound by which quick lime may be replaced in the mixture, there may specially be named burnt quick lime, slaked lime, limestone or calcium carbonate, dolomite, magnesium oxide, calcium sulphate, sodium hydroxide, sodium carbonate, sodium sulphate, a plurality of which may also be mixed with spodumene, to react therewith during calcination. With the addition of calcium sulphate, alone or together with lime, before calcination, with spodumene, it is again the small quantity of the total addition of alkaline earth oxide, which distinguishes over the processes known heretofore. In the known processes, a calcined product is produced in which silicic acid is in the state of saturation, as orthosilicate of lime and the lithium as a soluble compound in pure water.

It is very important to note that the addition to the spodumene of small quantities of oxides, belonging to the group of the oxides of the alkali-metals or alkaline earthmetals must be effected before the calcination of the mixture and that a certain chemical reaction must take place to a greater or lesser extent, between the constituents during calcination, in order to alter the chemical constitution and the specific mineral nature of the spodumene. If on the contrary the spodumene were calcined alone, below the beta or gamma transformation, in the pure state and if the oxides of the same nature were added to the aqueous lixiviation solution, for instance, a small amount of burnt quick lime, to the mother liquor of sodium chloride the reaction would be nothing more than an accommodation of the pH of the dissolving liquid, at its most favorable degree of reaction. In the present process the pH is not a critical factor, since the dissolving liquid may be acid, neutral or alkaline.

The calcined spodumene with small quantities of alkaline earth oxides may acquire a certain amount of hydraulic properties, although this is not a necessary feature of the process according to the invention and the effect is somewhat like that encountered in the hardening of Portland cement, though to a much lesser degree. As in cement, the presence of some electrolytically dissociated salts favors the rapid hardening of the pulp, especially if heated beyond 100° C. under pressure. Due to the coagulation the dissolving action of the saline solution may be seriously hampered and it is advisable and even sometimes necessary to stir up the mass in the autoclave.

The disadvantageously effect of hydraulicity after calcination is largely compensated by the rapidity of the reaction of the spodumene reacted during calcination with the small addition of the oxide as above. At a sufficiently high temperature the hydraulic reaction in the autoclave, may take place almost immediately and if performed under continual stirring of the pulp the coagulation of the mixture is avoided and its lithium content is rapidly dissolved into the saline solvent so that the leaching is rendered substantailly complete and irreversible.

In this manner, the low hydraulicity, caused by the calcination of the spodumene mixed with a small amount of lime, and the chemical reaction of the mixture, is followed by the rapid digestion of the calcined product which is rather inert in pure water, by the ionizing action of the saline solutions.

Since the spodumene is contaminated by the absorption of alkaline reacting lime during the calcination, there is no tendency for the formation of free silicic acid by the water treatment and hydrolysis of the calcined ore and for the production of an impermeable coating of silicic acid about the calcined ore particles. Inversely, in the presence of alumina which is contained in the ore, the alkaline lime silicate and alumina interact to form during calcination a hydraulic composition which, during the water treatment, acts by hardening in a similar manner as does cement. This cement-like hardening of basic character of the mass may be completely avoided by appropriate stirring, maintaining thereby the fine pulp in continuous suspension in the aqueous leaching solution of the electrolyte.

As to the question of temperature of calcination it is found in all cases that the phenomenon of the partial or complete fusion of the mixture, is a sure sign that the reaction is complete.

When the mixture is heated to its slagging or its sintering temperature, complete sintering facilitates the rapid extraction of the lithium compounds and the consequent high yield. It is found that long before the first signs of fritting of the mass, that is at about 700° C., the lime begins to react with the spodumene, which itself tends to be transformed at a higher temperature to its so-called beta variety, and to crumble to a very fine powder. If, afterwards, the interpenetration of the particles is not pushed too far by slagging or fritting and the calcination is suitably interrupted, the mass may also be kept in a pluverulent state or in a state of very feeble cohesion. Thus the expense of a further fine grinding can be obviated and the mass is prepared in a far better physical state to undergo the chemical reactions of subsequent digestion. On the other hand a partially or completely fused mass exhibits a chemical and physical state which is more stable and which permits a slower but more complete extraction to be obtained.

An accurate control of the best temperature of calcination depends partly upon the choice of the proper furnace for that purpose. There exist today well fitted furnaces for metallurgical agglomeration of ores and these may be used for fritting the mixtures of spodumene and lime in various proportions and a light agglomeration is obtained between 1000° and 1350° C. This operation will be easy, rapid and sure in its results.

The calcined mass is then rapidly cooled, and if necessary again finely pulverized. The calcined mass has some tendency to decompose in hot water, but the lithium cannot be sufficiently dissolved, even under pressure, without the use of leaching anions of acid radicals, for example solutions of alkaline or alkaline earth salts and generally at a temperature of over 100° C. under superatmospheric pressure.

Under a pressure of 20 atmospheres with a corresponding boiling temperature of nearly 210° C., a solution in water of sodium chloride as a solvent readily effects the extraction of the lithium compounds. At a higher pressure, e. g. 90 atmospheres at 300° C., the advantage of immediate extraction is obtained. The conditions are still better at a temperature of 400° C., but then a heavy autoclave is required.

The aqueous saline solution used to decompose the calcined product may comprise any water soluble metal salt, but is preferably a salt with an alkaline cation of the alkali or alkaline earth metals, without any regard to its acid, neutral or alkaline nature, the pH of the dissolving liquor not being critical. Excellent results are obtained with a solution in water, or sodium chloride, as well as with a water solution of sodium sulphate, sodium or calcium nitrate or nitrite or calcium chloride, or with a mixture of such salts. The rapidity of the reaction is favorably influenced by a higher concentration and also by a rise in the temperature.

In place of these salts in solution, an aqueous solution of free hydrochloric acid, or waste hydrochloric acid may be used.

The use of alkaline nitrate or sulphate, which have great solubility in hot water but are more expensive than sodium chloride, is not necessarily less economical, since all of the mentioned alkalis may be regenerated in the saline extraction solution, by a reagent such as sodium carbonate, which precipitates the lithium salt in sufficiently concentrated solution, whereas its acid radical returns to the sodium to regenerate the solvent. Lithium carbonate is formed, which is sufficiently insoluble to be separated by filtration, and the solution is regenerated to recover the sodium sulphate, or nitrate as well as the chloride and sodium carbonate is consumed.

Examples of carrying out the process are as follows:

*Example 1*

10 kg. of spodumene titrating only 6.5% of $Li_2O$, instead of the theoretical value of 8.07, thus corresponding to a content of 80%, and consequently to 8 kg. of pure lithium mineral, were reduced in a jaw-crusher to about pea grain size. At this state the ore was mixed with 1% of pure finely ground quick lime, i. e. 80 gr. of CaO for 8 kg. of pure spodumene, and the mixture was heated in a rotary furnace to about 1250° C.

The spodumene, when reaching first 1075° C., was found to have suddenly decrepitated and to have been reduced entirely and by itself into a very fine powder which, through the influence of the rotation of the furnace, was intimately mixed with the lime, the latter having been ground in advance to a very fine state. Under the influence of further heating to a higher temperature this lime reacted with the spodumene in the mixture, lowering its fusion point, so that already at about 1200° C. there were formed in the mass nodules of sintered material as a consequence of a partial premature fusion. The spodumene thus passed to the state of partial vitrification corresponding to the form called gamma-spodumene, which involves a much deeper change of its chemical and mineral nature by the destruction of its crystals which are rendered amorphous, than the first transformation into beta spodumene, which latter affects only the form of the crystals by increasing the specific volume of the latter, this causing their decrepitation without loss of their crystalline nature. The lime acts in the present case as a flux or a vitrification agent by which the fusion is quickened.

After having cooled and finely ground the mass, which easily lends itself to this end to a fineness corresponding to 200 mesh, there was formed therefrom a pulp by adding to it 15 litres of water in which there has been dissolved 5.3 kg. of sodium chloride thus forming a concentrated electrolyte solution. This pulp was treated in an autoclave during one hour under a pressure of 30 atm. and at a temperature of 235° C., under continuous stirring.

The analysis of the solution of salts issuing from the autoclave and that of the ore residuum after filtration, showed that 81% of the lithium previously contained in the ore were entered into the solution.

*Example II*

Starting from the same lithium ore with 6.5% of $Li_2O$ reduced to the same grain size, there was added thereto 5% of CaO in the form of $CaCO_3$, this corresponding to an addition of 400 gr. of quick lime contained in 715 gr. of calcium carbonate added after having been finely ground, to a charge of 10 kg. of ore.

This mixture was calcined in the same laboratory rotary furnace by heating the charge up to 1200° C., at which temperature it was found that there was already the formation of nodules of sintered material as the consequence of the commencement of a premature fusion. The lime had thus acted as a flux agent or as an agent of partial vitrification by lowering the fusion point of the spodumene.

The mass was then treated as in Example I—in the form of a pulp formed with 15 litres of water containing in solution 5.3 kg. of sodium chloride—during one hour in the autoclave at a pressure of 30 atm. and a temperature of 235° C., under continuous stirring.

The quantity of lithium which entered in this case into the saline solution was found to be about 100% of the initial ore content.

*Example III*

The same lithium ore with 6.5% of $Li_2O$, was calcined in the same rotary furnace without any addition of lime nor other flux, by heating it up to a temperature of 1270° C. and was thereby vitrified nearly completely by fusion. After grinding to a fineness corresponding to 200 mesh and after treating of a pulp, obtained from the calcined ore under the same conditions as those stated above, with sodium chloride, in an autoclave heated to the same temperature, under the same pressure and during the same time, the analysis of the solution showed the presence of 72% of the lithium content of the ore, in the saline solution, as the yield of the extraction.

According to this test the vitrification was thus performed without the aid of a flux, but at a calcination temperature which was slightly higher than in the cases of working with an addition of lime.

It is to be mentioned that the same test executed by working only until the formation of beta spodumene, without any addition of a flux, up to a temperature of 1100° C., at which decrepitation of the spodumene takes place, gave but a lithium extraction yield of only 58%, though all the other conditions of the test were the same as those stated in the preceding examples.

*Example IV*

The above calcination was repeated except to about 100 parts of spodumene calculated as the pure mineral 0.5% of quick lime was added based upon the lithium content of the spodumene and calcination was carried out at a temperature of 1250° C. for a sufficient period of time to bring about firstly the decrepitation of the original alpha spodumene, indicating the formation of beta spodumene and then the vitrification of the spodumene to form the gamma spodumene, whereafter the calcined product was quickly cooled, finely ground and leached with a leaching electrolyte to provide a yield of 77% of lithium recovered. Generally the leaching electrolyte as used hereinabove, comprises 39 parts of sodium chloride or 42 parts of anhydrous sodium sulphate to 100 parts of water, and is added to form a pulp of the calcined product containing about 20% to about 50% of solids in suspension of the electrolyte, leaching being carried out in an autoclave under efficient stirring and a pressure of about 16 atmospheres for about one hour.

The filtrate is mixed at a boiling temperature, with a calculated quantity of concentrated solution of sodium carbonate in order to precipitate the very small quantities of impurities i. e. silico aluminates of lime. (This operation may also be performed directly with the pulp, when it comes out of the autoclave.)

After filtration and light washing there is added a further measured dissolved amount of concentrated sodium carbonate solution at a boiling temperature in order to precipitate the greatest part of lithium carbonate out of the saline solution. The filtered and lightly washed product is of a marketable industrial quality. The slight residue of impurities which separates contains a small percentage of lithium and this may be added to the fresh spodumene before its calcination.

During the precipitation reaction there occurs at the same time the regeneration of the saline solution of sodium chloride or other salts by exchange of the alkali cation with the lithium salt in solution. Any deficiency in leaching electrolyte is compensated by an adequate addition of fresh salt (chloride, sulphate, nitrate or other sodium salt) and the solution together with the washing water is concentrated by evaporation to the required degree and is recycled to form new pulp. This example merely illustrates the new process, and it will be understood that as the method of separation of the lithium compounds out of the alkaline solution may vary, the nature of the products obtained may vary accordingly.

When the spodumene is calcined with normal sodium sulphate (and not with calcium carbonate or quick lime) the following particulars may be given as an example:

In place of 20 parts of calcium carbonate to 100 parts of pure spodumene, the chemical equivalent is added, i. e. 28 parts of anhydrous sodium sulphate, or an equivalent solution of this salt. While calcining that mixture, care should be taken to avoid any formation of sulphides, by avoiding the addition of solid fuel to the mass and by working with an oxidizing flame.

In the extraction autoclave there is used an electrolyte leaching solution which is likewise composed of sodium sulphate (though use may be made for example of a solution of sodium chloride) and, after filtration of the residue, the solution is regenerated by sodium carbonate, while precipitating the lithium carbonate to obtain the sodium sulphate or sodium chloride.

In place of the saline solutions for the dissolution of the lithium compounds out of the calcined product, use can be made of free hydrochloric acid in aqueous solution. While indeed the pure spodumene, calcined alone, is insoluble in a boiling concentrated solution of hydrochloric acid in water, the mixture of 100 parts of pure spodumene calcined with 10 parts of lime (for example) is decomposed by that reagent.

In order to reduce the simultaneous dissolution of considerable quantities of silico-aluminate together with the lithium oxide, it is preferable to use only the smallest possible quantities of hydrochloric acid. It is also preferable to get rid in the filtrate of the residue of the spodumene and eliminate as much as possible the dissolved silicic acid and aluminate, by evaporating to dryness and by heating to about 350° C., in order to render those impurities insoluble.

From this second residue the lithium salt may be extracted with water.

Example V 100 parts of spodumene (calculated as the pure mineral) being in the natural alpha state or in the calcined beta modification state are intimately mixed with 6 parts of anhydrous calcium sulphate (calculated at the pure state) in a wet grinder, by which these are at the same time reduced to a fineness corresponding to 200 mesh. The mass so obtained is heated at 1150 to 1200° C. and thereby agglomerated in a rotary kiln which is easily regulable.

When marked agglomeration (more or less complete fusion) has taken place, it is usually of advantage to grind the agglomerated or fused product to a fine state, after it has been suddenly cooled. The powdered calcine resulting from the initial mixture of spodumene and sulphate of calcium is then suspended in water, to form a pulp. The pulp contains from about 20 to 50% of solids in suspension and the lixiviating electrolyte is in solution, preferably in a concentrated state. Thus the water used to form the pulp may contain, in solution, 39 parts of sodium chloride or 42 parts of anhydrous sodium sulphate to 100 parts of water. The pulp may be prepared in an iron vat provided with a stirring device.

The pulp is brought into an autoclave provided with an efficient stirring and mixing device and adapted for continuous operation. It is heated, for example, to 200° C., and the vapors evolved by the liquid phase are kept under a pressure of about 16 atmospheres, these conditions being maintained for one hour, conveniently, without interrupting the stirring and thereafter the mixture is cooled. The pulp is then removed, decanted, filtered and washed with boiling water. A yield of nearly 100% is here obtained, the residue on the filter being practically free of lithium.

The few impurities may be removed as in Example I above and the electrolyte may be replenished as indicated in Example IV when the process is to be carried out in a continuous manner.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described being merely preferred embodiments thereof.

What is claimed is:

1. The method of producing lithium salts from silico-aluminous lithium ores, which comprises calcining the ore at a temperature from about 1100° to about 1300° C. to a state of at least partial fusion and vitrification, whereby the ore is converted into a vitreous and substantially non-crystalline state, cooling and finely grinding the calcined mass, and extracting the lithium as a salt therefrom with an aqueous leaching solution of a substance selected from the group consisting of hydrochloric acid, sodium chloride, potassium chloride, sodium sulfate, potassium sulfate, sodium nitrate, potassium nitrate, sodium nitrite, potassium nitrite, calcium chloride, calcium nitrate and calcium nitrite, at superatmospheric pressure and at a temperature from about 100° to about 400° C.

2. The method of claim 1, wherein the lithium ore is spodumene.

3. The method of producing lithium salts from silico-aluminous lithium ores, which comprises mixing with the ore from about 0.5% to 2.5%, based on the lithium mineral content of the ore, of a flux selected from the group consisting of calcium oxide, calcium hydroxide, calcium carbonate, calcium sulfate, dolomite, magnesium oxide, sodium hydroxide, sodium carbonate and sodium sulfate, calcining the mixture of ore and flux at a temperature from about 1100° to about 1300° C. to a state of at least partial fusion and vitrification, cooling and finely grinding the calcined mass, and extracting the lithium as a salt therefrom with an aqueous leaching solution of a substance selected from the group consisting of hydrochloric acid, sodium chloride, potassium chloride, sodium sulfate, potassium sulfate, sodium nitrate, potassium nitrate, sodium nitrite, potassium nitrite, calcium chloride, calcium nitrate and calcium nitrite, at superatmospheric pressure and at a temperature from about 100° to about 400° C.

4. The method of claim 3, wherein the lithium ore is spodumene.

5. The method of producing lithium salts from spodumene which comprises mixing with the spodumene from about 0.5% to 2.5%, based on the lithium mineral content, of calcium oxide as flux, calcining the mixture of ore and flux at a temperature from about 1100° to about 1300° C. to a state of at least partial fusion and vitrification, cooling and finely grinding the calcined mass, and extracting the lithium as a salt therefrom with an aqueous leaching solution of a substance selected from the group consisting of hydrochloric acid, sodium chloride, potassium chloride, sodium sulfate, potassium sulfate, sodium nitrate, potassium nitrate, sodium nitrite, potassium nitrite, calcium chloride, calcium nitrate and calcium nitrite, at superatmospheric pressure, and at a temperature from about 100° to about 400° C.

References Cited in the file of this patent

UNITED STATES PATENTS

| Number | Name | Date |
|---|---|---|
| 1,936,002 | Waggoner et al. | Nov. 21, 1933 |
| 2,230,167 | Sivander | Jan. 28, 1941 |
| 2,331,838 | Lindblad et al. | Oct. 12, 1943 |
| 2,516,109 | Ellestad et al. | July 25, 1950 |
| 2,662,809 | Kroll | Dec. 15, 1953 |

OTHER REFERENCES

Sternberg et al.: "Production of Lithium Chloride From Spodumene by a Lime Gypsum Roast Process," Bureau of Mines, Report of Investigations, R. I. 3848, March 1946.